(No Model.)
R. G. ELLSWORTH.
FARM GATE.
No. 489,469. Patented Jan. 10, 1893.
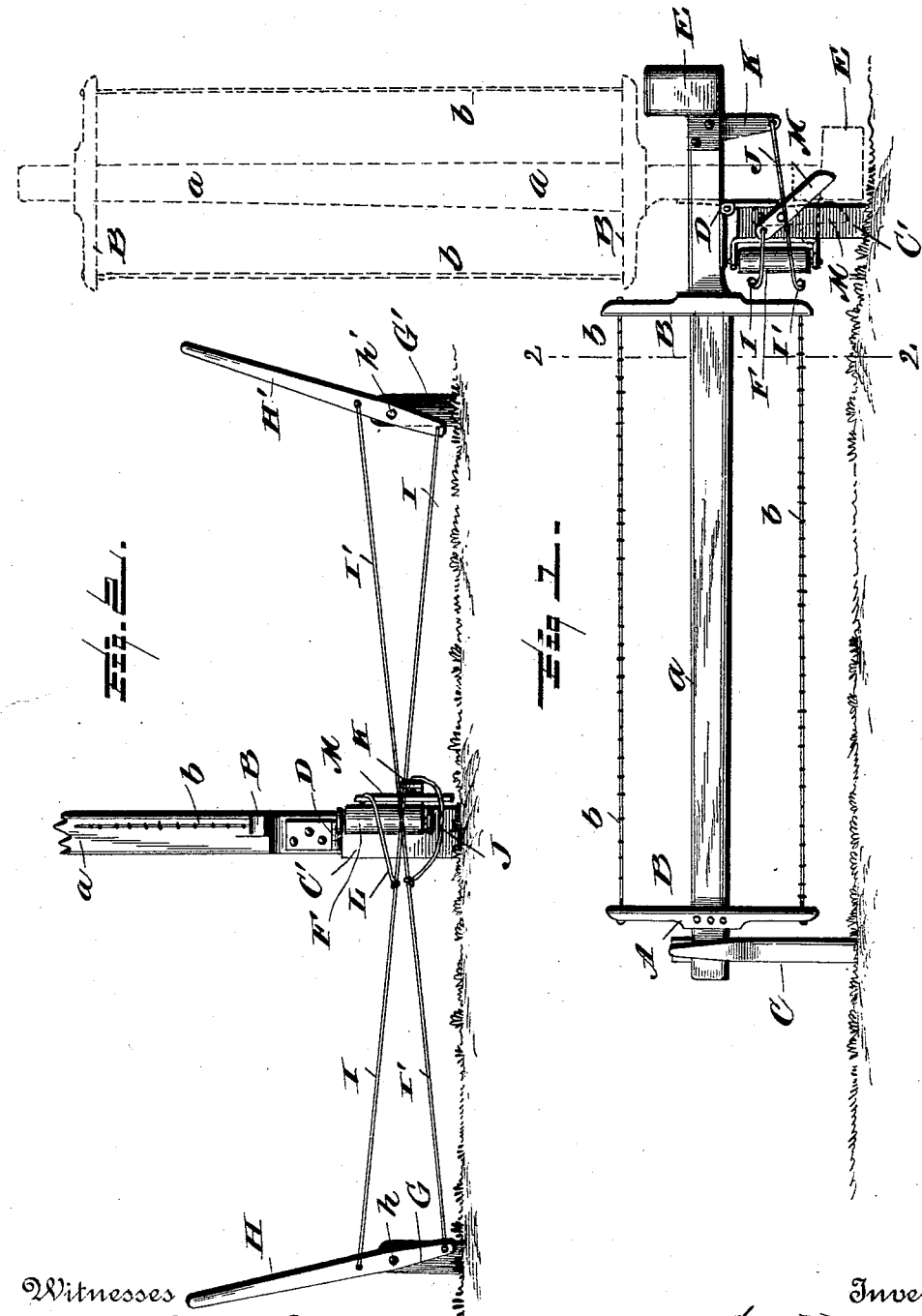
Witnesses
L. C. Hills
E. A. Bond
Inventor
Rufus G. Ellsworth.
per Chas. H. Fowler
Attorney

UNITED STATES PATENT OFFICE.

RUFUS G. ELLSWORTH, OF NORTHCOTT, KANSAS.

FARM-GATE.

SPECIFICATION forming part of Letters Patent No. 489,469, dated January 10, 1893.

Application filed September 15, 1892. Serial No. 445,953. (No model.)

*To all whom it may concern:*

Be it known that I, RUFUS G. ELLSWORTH, a citizen of the United States, residing at Northcott, in the county of Anderson and State of Kansas, have invented certain new and useful Improvements in Farm-Gates; and I do hereby declare that the following is a full, clear, and exact description of the same, reference being had to the annexed drawings, making a part of this specification, and to the letters of reference marked thereon.

This invention relates to certain new and useful improvements in gates of that class known as "hand openers" and it has for its object to provide a simple, cheap and efficient yet durable construction whereby the gate can be opened and closed from either side and which shall embody an arrangement of parts not liable to get out of order, and which can be easily set up by one not skilled in the art.

Other objects and advantages of the invention will hereinafter appear and the novel features thereof will be specifically defined by the appended claim.

The invention is clearly illustrated in the accompanying drawings, which, with the letters of reference marked thereon, form a part of this specification and in which Figure 1 is a front elevation of the gate. Fig. 2 is a vertical section on the line 2 2 of Fig. 1 with the gate elevated and a portion thereof broken away.

Like letters of reference indicate like parts in both of the views.

Referring now to the details of the drawings by letter, A designates a gate which may be of any suitable form, but in the present instance consists of the longitudinal bar $a$ to which are secured the bars B to the ends of which are attached the wires $b$ in any suitable manner.

C is the latch post, having a bifurcation or notch to receive the free end of the gate and support the same when down, as seen in Fig. 1.

C' is a short post placed in the ground to one side of which is secured one part of a hinge D, the other portion being secured to the under side of the bar $a$ of the gate as seen in Fig. 1. The longitudinal bar extends beyond the hinge and is provided with a counterbalance weight E affixed thereto in any suitable manner.

F is a vertical roller suitably journaled upon the front side of the post C and over which are designed to work the cords or wires now to be described.

G and G' are short posts placed in the ground at the proper places one upon each side of the gate and upon each of these posts is pivoted a lever H or H' the pivots $h$ and $h'$ being between the ends of the levers as seen in Fig. 2.

I is a cord or wire having one end connected to the lower end of the lever H' and to its other end connected to the lever H at a point above its pivot.

I' is a cord or wire having one end secured to the lower end of the lever H and its other end to the lever H' above its pivot all as shown in Fig. 2. To the cord or wire I' is attached one end of a short cord or wire J the connection being made near the center of the length of the said wire I' and the other end of the short wire is connected to an arm K which is attached to and depends from the bar $a$ of the gate near its weighted end as seen best in Fig. 1.

L is a short cord or wire attached at one end to the cord or wire I near the center of its length and at its other end to one end of an arm M which is pivoted between its ends as at $m$ to the post C' on the side at right angles to the side on which the hinge is secured as seen best in Fig. 1, the lower end of said arm being arranged to work behind the arm K as seen in Fig. 2 and to engage a bend therein or the lower end of the weight when the cord or wire to which it is connected is pulled upon, if the gate is in its vertical position. All the cords or wires work over the vertical roller as seen in both views.

The operation will be readily understood from the foregoing description when taken in connection with the annexed drawings and a detailed description thereof is not deemed necessary. It might be well to state however that with the gate in its horizontal position it may be opened from either side by a simple movement of either one of the levers which will draw on the cords so as to throw the gate into a vertical position where it will be sustained by the counterbalance weight; to close the gate all that is necessary to do is to move either of the levers in the opposite direction when the arm M will engage the under side of the weight or the arm K and further movement of the lever will throw the gate downward into its horizontal position. The bend in the arm K serves to hold the arm M into its work so that the parts will be positive in their movements.

The device is simple, cheap of manufacture, not liable to get out of order, easily operated, durable, and, in practice, has proved most efficient for the purposes for which it is intended.

What I claim as new is:—

The combination with the hinged gate and its hinge-post, of the pivoted levers, the vertical roller on the gate hinge-post, the arm on the weighted end of the gate, the pivoted arm on the hinge-post, the cords crossed as described and connecting the levers upon opposite sides of their pivots, and the short cords connecting the said cords with the said arms and passed over the said roller, substantially as and for the purpose specified.

In testimony that I claim the above I have hereunto subscribed my name in the presence of two witnesses.

RUFUS G. ELLSWORTH.

Witnesses:
J. C. MERRILL,
L. MERRILL.